UNITED STATES PATENT OFFICE.

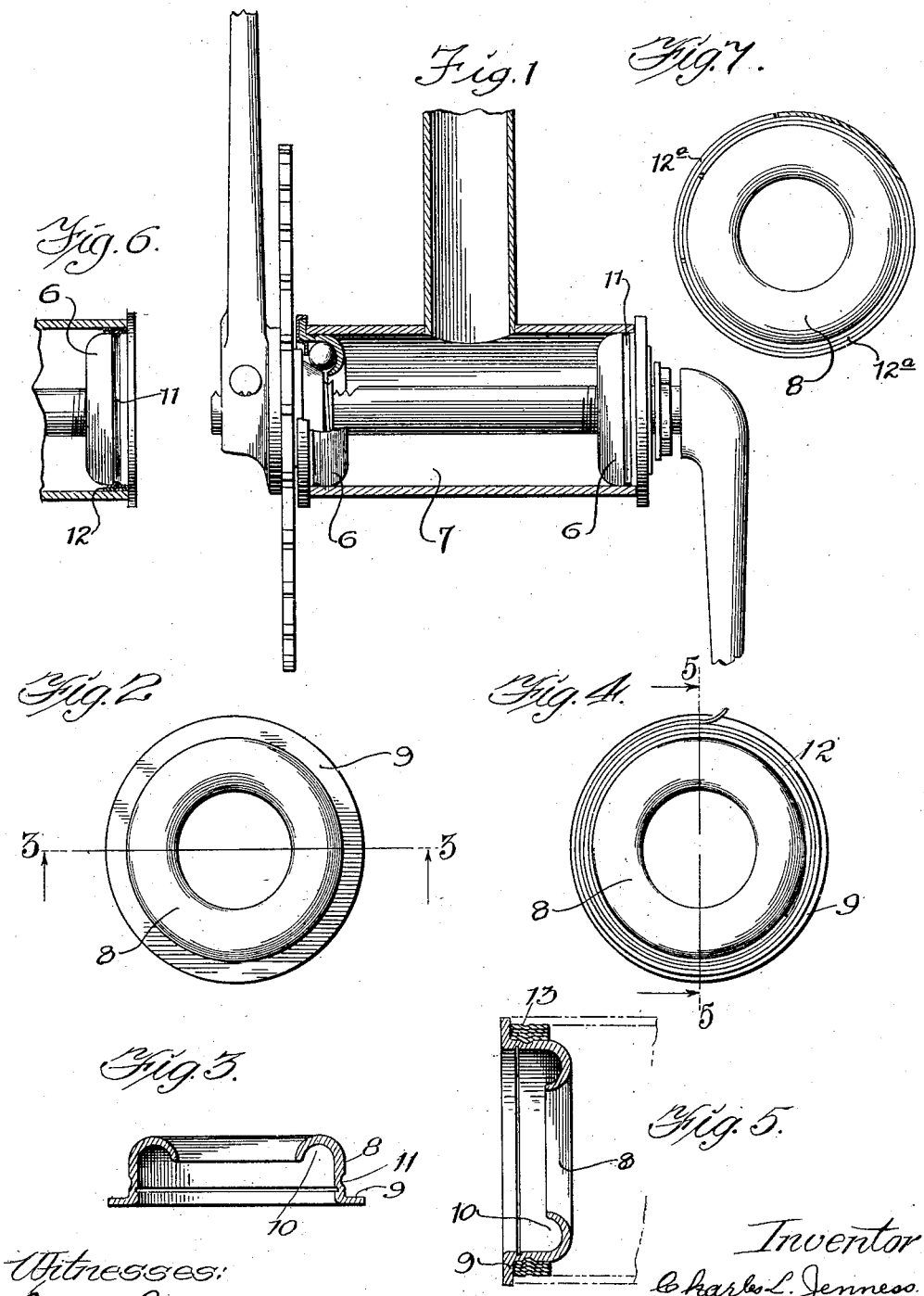

CHARLES L. JENNESS, OF CHICAGO, ILLINOIS.

ADJUSTABLE BEARING-CUP.

978,756. Specification of Letters Patent. Patented Dec. 13, 1910.

Application filed January 25, 1910. Serial No. 539,979.

*To all whom it may concern:*

Be it known that I, CHARLES L. JENNESS, a citizen of the United States, residing at Chicago, in the county of Cook and State of Illinois, have invented certain new and useful Improvements in Adjustable Bearing-Cups, of which the following is a specification.

This invention relates to bearing cups for balls and is more especially designed for use by bicycle repair-men, who are often called upon to fit new ball cups into the tubular hanger brackets of bicycles. Among bicycle manufacturers there is great variation in the diameters of the tubular hanger brackets, for which reason, difficulty is often experienced by the repair-men in finding ball cups of a proper diameter to fit the bicycle undergoing repairs. Delay and inconvenience are thus occasioned to the user of the bicycle, and frequently it becomes necessary to send to the original maker in order to secure cups of the desired size. Sometimes it is impossible to procure such cups, so that it may be necessary to manufacture special cups at considerable expense and delay.

The object of the present invention is to provide a cup which is surrounded by a bushing, which may be removed in whole or in part, to reduce the cup to the required diameter, thereby enabling the cup to be modified or adjusted to any desired size. Further objects will appear from a detailed description of the invention, which consists in the features of construction and combination of parts hereinafter described and claimed.

In the drawings, Figure 1 is a sectional elevation of a hanger bracket, showing the bearing cups of the present invention in place, with the bushing entirely removed; Fig. 2, a face view of one of the cups, with the bushing removed; Fig. 3, a cross sectional view on line 3—3 of Fig. 2; Fig. 4, a view of one of the cups with the bushing in place; Fig. 5, a cross sectional view on line 5—5 of Fig. 4; Fig. 6, a view similar to Fig. 1, showing the bearing cup in place, surrounded by the requisite thickness of bushing; and Fig. 7, a modified form of making the strips.

In the drawings, cups 6 are fitted into the ends of a tubular hanger bracket 7, the diameter of which may vary in machines of different makes. Each of the cups is formed to have a cylindrical body portion 8, provided at one edge with an outwardly extending annular flange 9, and inturned at the other edge to afford a groove or runway 10, for the reception of the balls. The outer face of the body portion of the cup is provided with a circumferentially extending groove or channel 11, around which grooved portion of the body is wound a strip of metal 12, of a length to afford a substantial increase in the diameter of the body of the cup as a whole. As shown in Fig. 5, the strip is rolled to afford a continuously extending bead 13, with its corresponding groove, so that when the strip is wound on to the body of the cup, the bead on the innermost coil of the strip will register with the groove 11 around the body of the cup, and the beads and grooves of the succeeding coils will register with one another. It is desirable that the strip be wound tightly enough so that the beads and grooves will interlock closely together, with the result that the bushing, as a whole, will be firmly locked onto and made practically integral with the body of the cup, so that there can be no disengagement of the bushing from the cup when the parts are in position in the bracket. After the entire strip has been put in position on the cup, it is desirable to dip the bushing thus formed in a bath of solder, or other binding material, so that the coils will be secured together with sufficient firmness to prevent accidental displacement of any portion of the strip.

Although it is preferred to form the bushing from a continuous spirally wound strip of material, it is not the intention to limit the invention strictly to this formation, since substantially the same result might be obtained by the use of a strip formed in sections and spirally wound, or concentrically wound, as shown in Fig. 7, in which the sections are indicated by the numeral 12$^a$. It will be understood that in the claims, the term "strip" is intended to embrace either a continuous strip or a strip formed in sections, and that the term "coils" is intended to indicate the layers of such strip, whether wound spirally or concentrically.

In use, the repair-man will first ascertain the interior diameter of the tubular hanger bracket into which the cups are intended to be inserted. Having found this diameter, he can then unroll from the cups, if necessary, an amount of the strip sufficient to reduce the diameter of the body portion of the cup, as a whole, to the required size. The coils of the strip, being secured together, can be torn apart without difficulty by the employment of the proper tools, although the binding material will serve to prevent accidental disengagement of the coils from one another. Obviously, if necessary, the entire strip can be removed from the cup, which is the condition shown in Fig. 1. By having one or two stock sizes of cups and bushings, all styles of machines can be fitted, which results in great saving of time and money for all concerned.

I claim:

1. In combination with a bearing cup or the like, a bushing on the cup consisting of layers of material, the layers being secured together in a manner to permit of the desired amount being uncoiled and cut away, and the layers being provided with registering elevations and indentations to interlock the parts together.

2. In combination with a bearing cup, or the like, a bushing on the cup in the form of a strip of material, the coils of the strip being secured together in a manner to permit of the desired length of strip being uncoiled and cut away, the cup and strip being provided with registering elevations and indentations to interlock the parts together, substantially as described.

3. In combination with a bearing cup, or the like, a bushing on the cup in the form of a continuous strip of material, the coils of the strip being secured together, in a manner to permit of the desired length of strip being uncoiled and cut away, the cup being provided with a circumferentially extending channel and the strip being formed with a continuously extending bead, with its corresponding channel, the beads and channels of the cup and the coils of the strip being formed to interlock with one another, substantially as described.

CHARLES L. JENNESS.

Witnesses:
Thos. A. Banning, Jr.,
Samuel W. Banning.